May 16, 1933.  F. WESTCOTT  1,909,644
SYNCHRONIZING DEVICE FOR TRANSMISSIONS
Filed June 5, 1931  2 Sheets-Sheet 1

May 16, 1933.  F. WESTCOTT  1,909,644
SYNCHRONIZING DEVICE FOR TRANSMISSIONS
Filed June 5, 1931  2 Sheets-Sheet 2
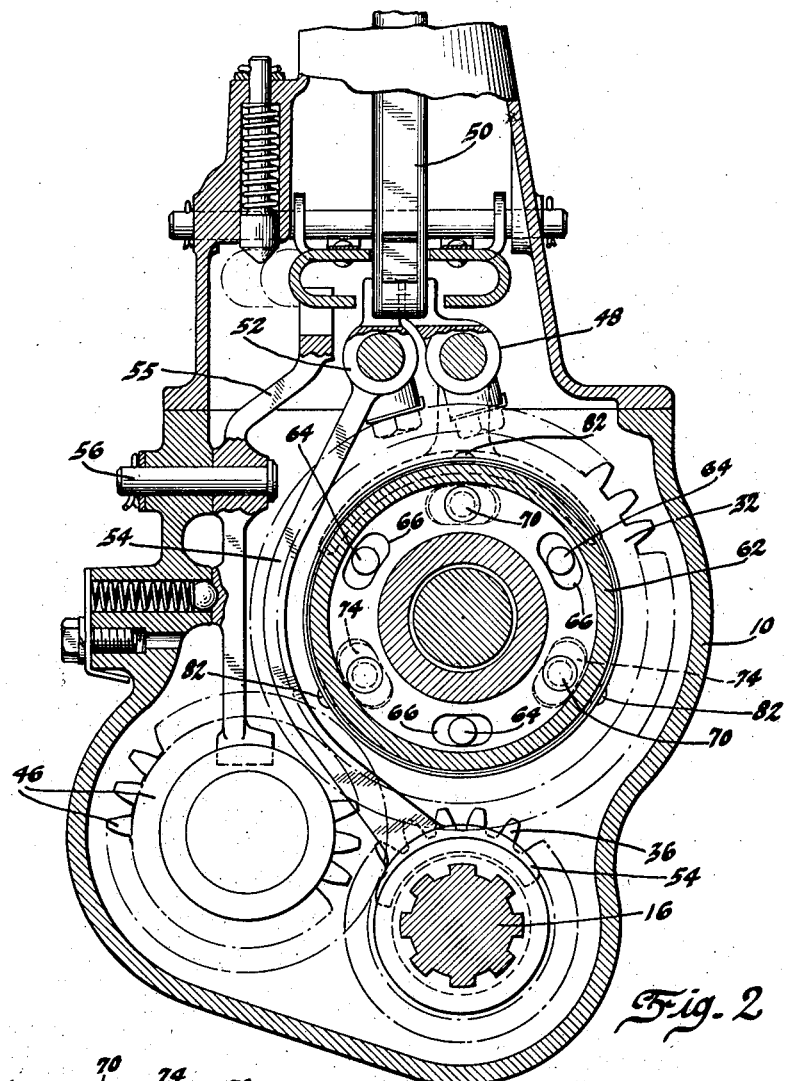
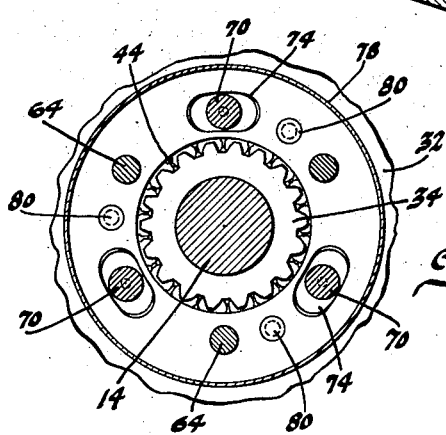

Patented May 16, 1933

1,909,644

UNITED STATES PATENT OFFICE

FRANK WESTCOTT, OF LUTON, ENGLAND, ASSIGNOR TO GENERAL MOTORS CORPORATION, OF DETROIT, MICHIGAN, A CORPORATION OF DELAWARE

SYNCHRONIZING DEVICE FOR TRANSMISSIONS

Application filed June 5, 1931. Serial No. 542,451.

This invention relates to composite jaw and friction clutches and to combinations of such clutches with variable speed-ratio power transmissions including plural gear trains adapted to be selectively coupled.

Composite clutches have been used hitherto in transmission mechanisms for the purpose of coupling two members thereof, initially rotating at different relative speeds, by first effecting engagement of the friction elements, thus easing the two members to the same or approximately the same speed, and then intermeshing the jaw elements,—thereby avoiding noisy clashing and possible breakage of the jaws or teeth. In a motor vehicle transmission it is essential to safety and proper control of the vehicle that changes from one gear train to another be effected rapidly. It is necessary, therefore, in order to make a change efficiently, to bring the two members to be positively coupled to approximately equal speeds by the friction elements in a brief period of time; and this requires the application of a definite minimum of pressure between the friction elements. It is difficult for the operator to gauge the amount of pressure he should apply to cause engagement of the friction elements and the time he should maintain that pressure; hence it has been proposed to interpose somewhere in the control mechanism between the movable element of the jaw clutch and the movable element of the friction clutch a force measuring and timing device functioning to prevent the movable jaw element from intermeshing with its companion until sufficient mutual frictional resistance to differential rotation of the friction elements shall have been induced for a sufficient period of time to assure at least approximate synchronization of speeds of the jaw elements.

In the specification of British patent to E. A. Thompson #275,159 there is disclosed one form of means for resisting intermeshing of the jaw elements of a composite clutch until force enough has been applied, during sufficient time, to the movable friction element to assure at least approximate synchronous rotation of the jaw elements before the intermeshing movement can be completed. This form of means comprises a releasable latch interposed somewhere between the movable jaw element or a part movable with it and the movable friction element, the release of said latch being opposed by a liquid brake which has been calibrated and adjusted to resist unlatching until time enough has elapsed and effort enough has been expended to effect synchronization through engagement of the friction elements.

In another form of means for resisting intermeshing of the jaw elements of a composite clutch until the friction elements have brought about substantially equal speeds of rotation of the former, the movable jaw element is restrained from intermeshing with its companion by inclined detents or checks formed on a movable friction element and one of the jaw elements or a part rigid with it. Meshing of the jaw elements is resisted by a force which is in direct proportion to the magnitude of the speed differential between the jaw elements to be intermeshed and when the speed differential becomes zero the resistance to intermeshing substantially disappears so that the jaw elements may be readily intermeshed. Examples of the latter type are disclosed in U. S. patent to Tyler #1,702,753 and British patent to Bernard Thomson #332,302.

Friction clutch checks to intermeshing of jaw elements, as in the latter mentioned type, interpose resistances in proportion to needs, instead of the definite precalculated resistance of the former mentioned type. This invention is an improvement upon said latter type. Its objects are to simplify and compact the construction of synchronizable variable speed-ratio geared transmissions, increase their efficiency, and otherwise improve them by means of the novel elements and combinations hereinafter specifically described and illustrated in the accompanying drawings whereof,—

Fig. 2 is a transverse section on the planes indicated by the broken line 2—2 of Fig. 1;

Fig. 3 is a section of a fragment on the plane indicated by broken line 3—3 of Fig. 1;

Figure 1:
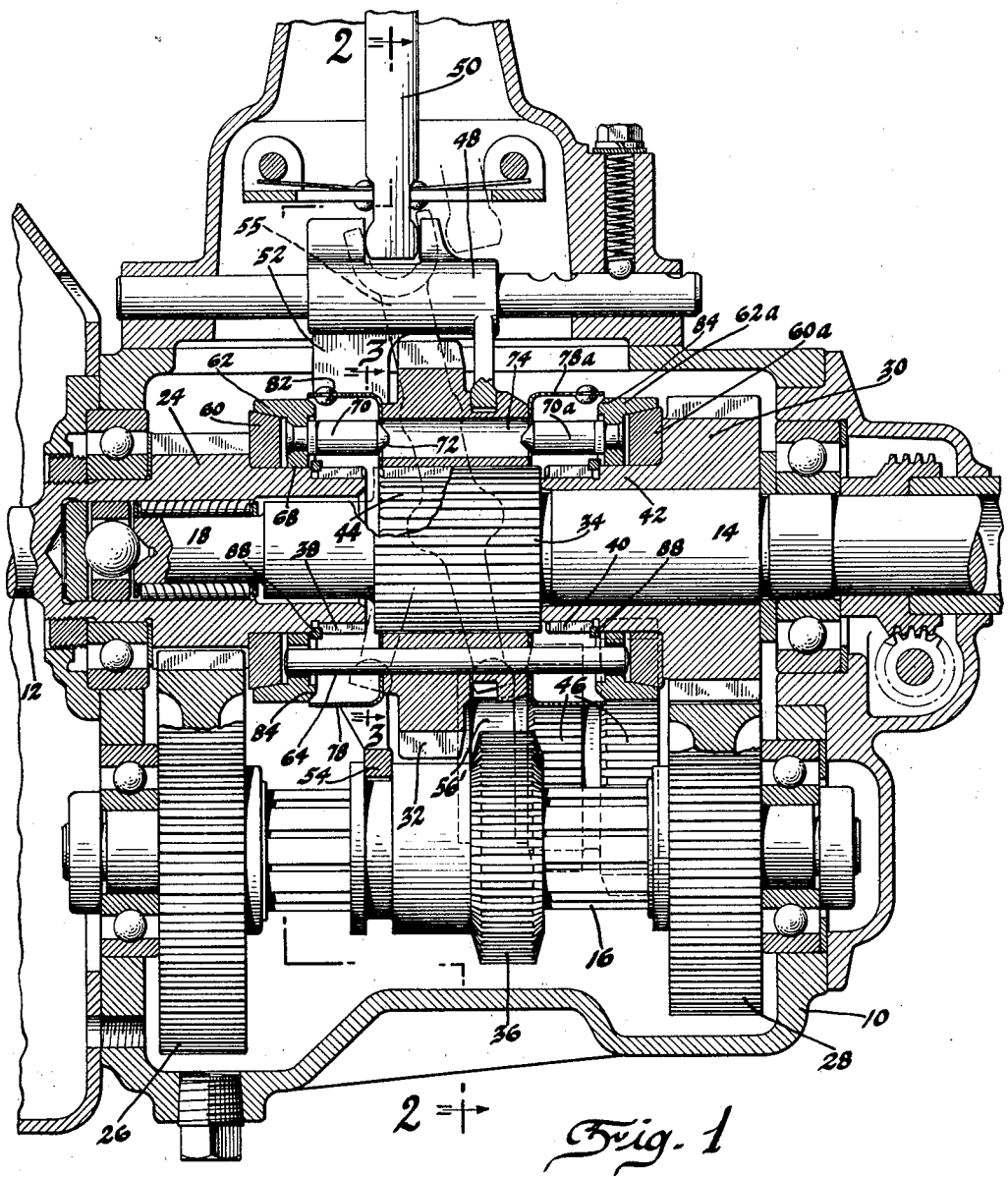
Fig. 1 is a longitudinal section through a motor vehicle transmission embodying the invention.

The invention is illustrated as embodied in a motor vehicle transmission wherein the power output shaft may be rotated in the same direction as the power input shaft at three different relative speeds, and at one relative speed in the reverse direction.

Referring to the drawings numeral 10 indicates a gear box or housing enclosing the change speed mechanism; 12 indicates the power input shaft, supported in ball bearings at the front end of the housing, and 14 a power output shaft, arranged in axial alinement therewith, supported in ball bearings at the rear. Numeral 16 indicates a lay or counter shaft. The shaft arrangement described is conventional in motor vehicle transmissions, power input shaft 12 being connectible to the engine by means of a clutch under control of the operator as is usual. Power output shaft has a reduced forward end 18 piloted in a bore in the rear end of the power input shaft and in contact with the usual roller side and thrust bearings. The usual driving pinion 24 rigid with shaft 12 within the housing serves to rotate countershaft 16 by engaging with gear 26 fast on said counter shaft at its front end. Gear 28 fast on said counter shaft at its rear end is in constant mesh with gear 30 bearing freely on shaft 14 but adapted to be locked thereto. A gear 32 axially slidable on splined portion 34 of shaft 14 may be meshed with pinion 36 which is slidable on splines on the countershaft. Shaft 12 has external clutch teeth 38 in its rear end and gear 30 has similar clutch teeth 40 on the forward end of its hub-like extension 42. The internal splines on gear 32 serve also as clutch teeth and may engage either the teeth 38 or the teeth 40 accordingly as gear 32 is moved forward or rearward.

When gear 32 is moved so that its internal teeth or splines 44 intermesh with teeth 38 on the power input or drive shaft 12, said power input shaft 12 and the power output or driven shaft 14 are locked positively together and rotate in the same direction at the same speed. Under this condition the transmission is in its highest or third speed-ratio "forward" relation. When gear 32 is moved so that its internal teeth or splines 44 intermesh with teeth 40 on gear 30 the latter is locked to shaft 14. Shaft 14 is then driven "forward" by shaft 12 through pinion 24, gear 26, countershaft 16, gear 28 and gear 30, in the second or next lower speed-ratio. When gear 32 is in the position shown in Fig. 1, if pinion 36 be slid into mesh with it, then shaft 14 may be rotated in first-speed or lowest speed-ratio "forward" through pinion 24, gear 26, spline shaft 16, pinion 36, and gear 32. Reverse rotation of shaft 14 with respect to shaft 12 may be obtained by meshing reverse idler 46 with pinion 36 and gear 32.

For sliding gear 32 forward or rearward to couple either third speed or second speed trains a slidable shifter member 48 is provided with a forked shifter arm engaging a circumferential groove in a hub on said gear. Member 48 may be moved by a selectively manipulated shifter lever 50 the work end of which is adapted to be engaged in a notch in said member.

For sliding pinion 36 into mesh with gear 32 in order to couple first or low speed-ratio train, shifter member 52 may be slid forward independently by selective engagement therewith and proper manipulation of lever 50; shifter member 52 carries a shifter fork 54 engageable with a groove in the hub formed on said pinion 36.

Idler gear 46, has two series of teeth one of which is adapted to intermesh with gear 32 and the other with pinion 36 when said idler is shifted forward (to the left as shown in Fig. 1). Idler 46 may be shifted by manipulating shifter lever 50 after selectively engaging its end with reverse shifter member 55, shown as a lever fulcrumed at 56 on the housing and having a lower end received in groove 56′ of reverse idler gear 46.

While shifting gear 32 selective shifter lever 50 is engaged with both shifter members 48 and 52 as illustrated in Fig. 2 and therefore causes low speed-ratio pinion 36 to slide on the countershaft in unison with movements of gear 32 in order to prevent interference.

The general organization of gear trains set forth in the foregoing paragraphs is not claimed in this application and has been illustrated and described in order to make clear how the improvement to be presently described and claimed may be utilized to full advantage.

Rigidly fixed to power input 12 is a friction clutch element 60 having an external conical friction surface. Friction clutch element 60 is illustrated as a ring fast to said shaft between gear 24 and clutch teeth 38 and is therefore compelled to partake of the movements of said shaft, gear and clutch teeth. Its conical friction surface is disposed at a greater radial distance from the common axial line of shafts 12 and 14 than are the teeth 38 of the corresponding jaw clutch element. Said friction clutch element 60 and corresponding jaw clutch element 38 constitute, in the illustrated embodiment, the driving side of the composite clutch or coupling which couples the input and output shafts of the direct drive train,—affording the highest car speed-ratio. The driven side of the direct drive train coupling consists of the before described gear 32, insofar as it functions as a clutch, with its internal gear teeth 44 adapted to intermesh with said teeth 38 on the input shaft, together with the friction clutch element 62 arranged to have a lost motion driving connection with said gear 32 and therefore with shaft 14, and sufficient axial movement to permit its internal conical friction surface to be engaged with and disengaged from the mating external conical friction surface on the element 60.

Friction clutch element 62, which for convenience of nomenclature may be designated the floating element of a friction clutch pair, is positively coupled to shaft 14 by means of driving pins 64 preferably slidably mounted in holes formed in gear 32 parallel with its axis and having projecting ends adapted to interlock with floating clutch element 62, but in such manner as to permit limited rotary movement of the latter with respect to shaft 14 and gear 32. Therefore element 62 may be driven by shaft 14 positively, but through a lost motion connection which is provided by circumferential slots 66 or equivalent openings through the floating clutch element, within which the ends of driving pins 64 project.

Floating friction clutch element 62, coupled as described by a positive although lost motion connection to shaft 14, has a constant frictional bearing connection with input shaft 12, through cylindrical bearing surfaces 68 which serve to center and permit necessary axial movement of said clutch element. As the axial movement necessary is very small the conical surfaces may also have a free bearing connection permitted by the interposed oil film, which is always present during normal operation when the parts are in the neutral or uncoupled position illustrated. Said bearing connections acting through the ever present oil film tend to cause the floating clutch element to rotate with shaft 12. Whenever shafts 12 and 14 rotate asynchronously this drag of the bearing surfaces and oil film tends to rotate the friction clutch element 62 with respect to shaft 14 until the pins 64 engage one end or the other of the slots 66 according to the sense of the differential movement. Hence, at all times when shafts 12 and 14 are not directly coupled, element 62 is being rotated by shaft 14 or held by it, with pins 64 engaging one end of each slot 66. Three pins and three slots respectively equiangularly spaced one from another are illustrated. The purpose of the described lost motion connection between the floating friction clutch element and the driven or output shaft 14 will appear hereinafter.

Cooperating detents are provided on the floating friction clutch element and the gear 32, which are adapted to function, whenever the rotations of input and output shaft are asynchronous and attempt is made to couple them, to first cause adequate frictional engagement between the frictional clutch elements to bring about synchronous rotation and to check the advance of the slidable jaw clutch element to intermeshing position until synchronous rotation occurs. Numeral 70 indicates a detent stud or pin, of which there are shown three, riveted or otherwise secured firmly to floating clutch element 62, midway between the slots 66. The pins 70 have inclined detent or checking surfaces which are provided in the form shown in Fig. 1 by a tapered extremity 72.

Gear 32 has openings 74, or equivalent clearance spaces shown in Fig. 1 as three in number each extending through said gear parallel with its axis, and disposed midway between the holes in which the pins 64 are fitted. The extent of the openings 74 circumferentially of the gear is such that when floating clutch element 62 is at one extremity or the other of its limited range of movement with respect to shaft 14 and gear 32, the tapered end of each stud will slightly overlap the gear at one edge of each opening 74, the edge of which may be slightly chamfered or rounded at this location.

It will now be clear that if there is a differential rotation tending to hold the clutch element in said position in which the tapered ends 72 of studs 70 overlap the gear 32 as described, any force applied to shift said gear in a direction toward the clutch jaws 38, will push the clutch element 62 into frictional driving engagement with the friction clutch element 60, so as to frictionally couple the input and output shafts through the parts described. As long as there is a substantially high speed differential between the two shafts, the detent surfaces prevent further advance of gear 32 toward clutch element 38. When the differential movement is substantially zero, gear 32 may be easily advanced, since the force tending to keep the detent surfaces in axial alinement has disappeared so that axial pressure against the inclined detent surfaces of studs 70 may easily rotate shaft 12, the main clutch having been disengaged as is usual in shifting motor vehicle gears. The jaw clutch elements may then be intermeshed without clash, studs 70 freely entering openings 74. Adjacent ends of clutch teeth 38 and 44 are preferably tapered or chamfered to pilot them into intermeshing relation.

When the lubricating oil is of low viscosity, as may result from high temperatures or dilution with volatile fuel, the drag of the oil between the bearing surfaces of element 62, shaft 12 and element 60, may be insufficient to insure the setting of the detent surfaces in axial alinement. Yieldable means are therefore provided to press said floating friction clutch element 62 into closer frictional engagement with element 60 during the initial portion of the axial movement of jaw clutch teeth 44 toward jaw clutch teeth 38. Said means is illustrated as a dished elastic sheet metal device 78 riveted to a face of gear 32 at 80 the cylindrical rim of which is adapted to surround the cylindrical perimeter of floating clutch element 62 and slide easily over it during the act of intermeshing of clutch jaws 38, 44. The rim of member 78 is equipped with bosses 82, (shown in Fig. 1 as small rivets) which bear upon the chamfered edge 84 of said floating clutch element when gear 32 is advanced toward coupling position and applies pressure enough to insure setting of the detent surfaces. After synchronization has been accomplished member 78 may slide over element 62 quite freely as the internal diameter of the thin rim of said member is slightly greater than the external diameter of element 62, permitting slight expansion at the bosses and slight contraction between them. The rim may be kerfed or slitted from the edge toward gear 32 if desired.

The elements for coupling second speed train are the same as those described for coupling third or high speed train. In the second speed train gear 30 becomes a driving element and is to be coupled to driven or output shaft 14. The friction element 60a is fast to gear 30, the rear ends of pins 64 engage in slots in floating friction clutch element 62a which is provided with detent studs 70a adapted to engage gear 32 at the edges of openings 74 to check the movement of said gear toward the rear until synchronization of speeds has been accomplished. A yieldable member 78a serves to insure alinement of the detent surfaces in the same manner as has been described with respect to the high-speed train.

The ends of pins 64 approach rather closely the inner faces of friction elements 60 and 60a, which are at a fixed distance one from the other and these ends remain engaged in the slots of floating clutch elements 62 and 62a in all positions of gear 32 since the latter slides with respect to them.

Assuming that a vehicle equipped with the disclosed transmission mechanism is running in low gear, shaft 12 rotating clockwise (viewed from the left of Fig. 1), and that it is desired to step up the speed: the operator releases the main clutch as usual, and by properly manipulating the shift lever 50 uncouples first or low speed train, then interlocks the shift lever with shifter members 48 and 52 as indicated in Fig. 2. Shaft 14 and gear 32 are now being driven by momentum of the vehicle and gear 30 rotating under the momentum of the train from gear 30 back to the main clutch and ordinarily is rotating at a higher speed than shaft 14 and gear 32 when the act of coupling gear 30 to shaft 14 is attempted. The differential rotation thus acts clockwise with the result that floating clutch element 62a is moved clockwise to the limit permitted by its lost motion connection with shaft 14 bringing the detent surfaces on floating element 62a and gear 32 into alinement so that now movement of shift lever 50 in a direction to slide gear 32 and the clutch teeth 44 into mesh with clutch teeth 40 will press the element 62a into frictional driving engagement with friction clutch element 60a. The interposition of the checking or detent surface of clutch element 62a, between clutch teeth 40 and gear 32 with its clutch teeth 44, prevents intermeshing of said clutch teeth until the force due to the inertia of the more rapidly rotating gear 30 and masses connected with it which keeps the detent surfaces alined has disappeared by reason of the frictional resistance to differential motion. As gear 30 and shaft 14 are now rotating synchronously gear 32 may be easily slid further, slightly displacing gear 30 angularly and allowing teeth 44 to intermesh with teeth 40.

Speed may be stepped up to third or high by moving the shift lever in the opposite direction whereupon the same mode of operation takes place between friction clutch elements 60, 62, gear 32 and clutch teeth 44 and 38 as has been described in stepping the speed from first to second.

Although specific embodiments are illustrated and are described herein by specific terms it is not intended that the details illustrated and the terms of description of such details shall be considered as limitations of the scope of the invention which is intended to be defined in the appended claims.

Having now particularly described and ascertained the nature of my said invention and in what manner the same is to be performed, I declare that what I claim is:—

1. In a variable speed-ratio transmission of the class described, the combination of two axially alined power transmitting members, a jaw clutch element fixed to one of said members, a cooperating slidable jaw clutch element on the other; a conical friction clutch element fixed with respect to one of said jaw clutch elements, a cooperating conical floating friction clutch element movable axially and having a lost motion driving connection with respect to the other jaw clutch element; cylindrical spacing studs having inclined detent surfaces interposed between said floating friction clutch element and the member by which it is driven and fixedly connected to one of them, the other having clearance openings provided with cooperating detent surfaces at their entrance ends; said detent surfaces being arranged, when the floating friction clutch element is at one limit of its rotary movement with respect to the member by which it is driven, to obstruct intermeshing of the jaw clutch elements.

2. A combination as defined in claim 1 in which the floating friction clutch element has a lost motion driving connection with the slidable jaw clutch element, the former carrying the detent studs and the latter having clearance openings with inclined detent surfaces at their entrance ends to cooperate with the studs.

3. A combination as defined in claim 1 in which the floating friction clutch element has a lost motion driving connection with the slidable jaw clutch element comprising a cylindrical pin on one element and a cooperating slot in the other.

4. In a variable speed-ratio transmission of the class described the combination of two axially alined power transmitting members, a jaw clutch element and a friction clutch element fixed to one of said members, a floating friction clutch element centered and bearing thereon; a slidable jaw clutch element on the other power transmitting member, a lost motion driving connection between the slidable jaw clutch element and said floating clutch element, said driving connection comprising pins slidable axially in the slidable jaw clutch element and engaging spaces in the floating clutch element of greater width than the pins, and inclined detent surfaces on said floating friction clutch element and said slidable jaw clutch element arranged to be alined when the floating clutch element is at one limit of its range of rotary movement with respect to the slidable jaw clutch element.

5. A combination as defined in claim 4 in which the floating friction clutch element is provided with studs having inclined detent surfaces and the slidable jaw clutch element is provided with clearance passages wider than the studs, the inclined detent surfaces on the studs overlapping said clearance passages when the floating friction clutch element is at one limit of its range of rotary movement with respect to said slidable jaw clutch element.

6. In a variable speed-ratio transmission a shaft having a gear loose thereon, a jaw clutch element and friction clutch element rigid with said gear; an enlarged splined portion in said shaft adjacent the jaw clutch element on said gear, said splined portion of the shaft and said jaw clutch element having substantially equal radii; a slidable jaw clutch element on the splined enlargement of said shaft adapted to be intermeshed with the jaw element of said gear; a floating friction clutch element journaled and axially movable on said gear and having a lost motion driving connection with said slidable jaw clutch element, detent surfaces and adjacent clearance spaces on said slidable jaw clutch element, and detent studs on said floating friction clutch element arranged to overlap said clearance spaces when the floating friction clutch element is at one limit of its range of rotary movement with respect to said slidable jaw clutch element.

7. In a variable speed transmission mechanism, a driven shaft provided with an enlarged splined portion, a slidable jaw clutch element provided with internal teeth guided in the grooves of the splined portion, a jaw clutch element coaxial with said driven shaft substantially equal in diameter to the enlarged splined portion of the driven shaft and adapted to interlock with the internal teeth of the slidable jaw clutch element, a friction clutch element driven with each jaw clutch element, one of said friction clutch elements being axially and angularly movable with respect to the element by which it is driven and arranged to be forced into driving contact with its companion element by the advance of the slidable jaw clutch element toward its companion and cooperating inclined detent surfaces on the axially and angularly movable friction clutch element and the member by which it is driven adapted to obstruct interlocking engagement of the jaw clutch elements until synchronization has been effected.

8. In variable speed transmission mechanism, axially alined driving and driven positive clutch elements, one of which is axially movable into and out of engagement with the other, a friction clutch element fixedly related to one positive clutch element, a friction clutch element having a lost motion driving connection with the other positive clutch element, cooperating detent surfaces on said last named friction and positive elements, said friction clutch elements being arranged to be pressed into mutual engagement by contact of one detent surface with the other upon the approach of the movable jaw clutch element toward its companion, and yieldable elastic means connected to one of the last named elements and extending axially toward the other and adapted to be deflected thereby in order to cause a light frictional engagement of the friction elements prior to contact of the detent surfaces.

9. A combination as defined in claim 8 in which the yieldable elastic means consists of a hollow elastic cylinder having bosses adapted to effect preliminary engagement of the friction clutch elements and thereafter expand and permit continued sliding movement of said slidable jaw element into engagement with its companion.

In testimony whereof I affix my signature.

FRANK WESTCOTT.